Patented Oct. 17, 1950

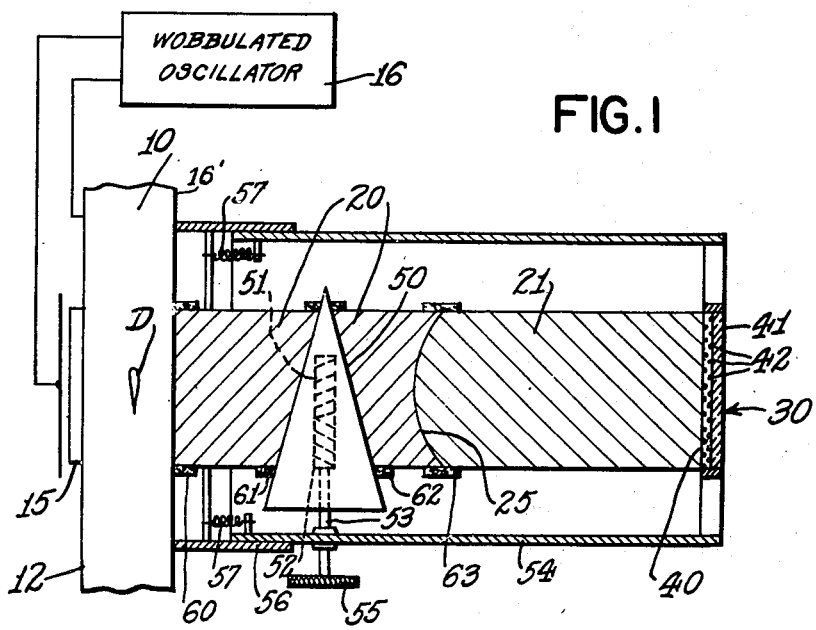
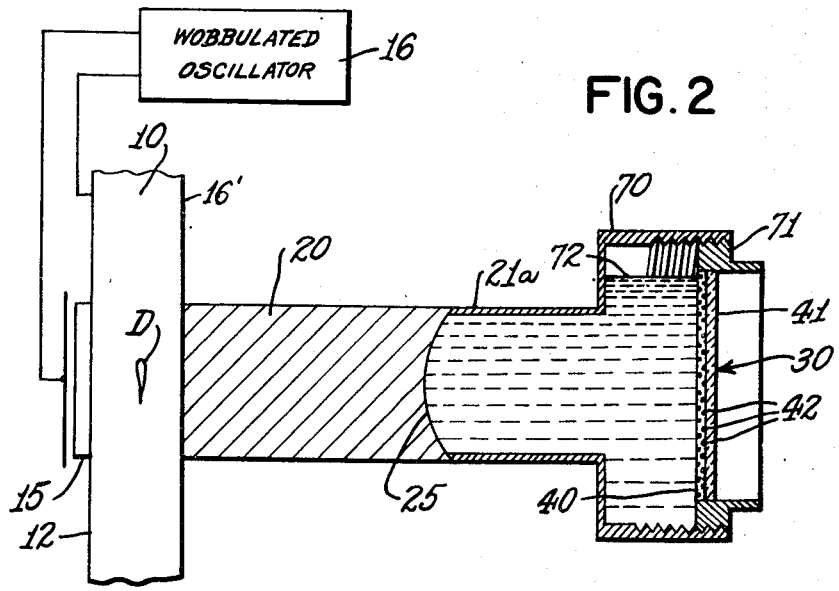

2,525,873

UNITED STATES PATENT OFFICE 2,525,873

LENS SYSTEM FOR ULTRASONIC VIEWING OF DEFECTS IN OBJECTS

Ralph B. De Lano, Jr., New York, N. Y., assignor to Sperry Products, Inc., Hoboken, N. J., a corporation of New York Application July 23, 1948, Serial No. 40,253

4 Claims. (Cl. 73—67)

This invention relates to the ultrasonic inspection of solids of the type wherein it is desired not merely to ascertain whether or not a defect exists and the location of such defect, but also to yield an actual representation of the defect. Various devices have been proposed for performing this function. Thus, it has been proposed to pass ultrasonic vibrations into the object under test by means of an electro-acoustic transducer, receive by a second electro-acoustic transducer those vibrations which pass through the object and scan the received vibrations over an area to obtain a visual indication of the flaw. This, however, involved a highly complicated system of mechanism. Still another method which has been tried to obtain an actual representation of hidden defects consists in submerging the object under test in liquid, passing ultrasonic waves therethrough by means of an electro-acoustic transducer, concentrating by a lens system those waves which have passed through the object, and focusing these waves on some form of image forming device such as an image cell. This method, however, required the highly undesirable step of submerging the object under test in a liquid and also required the use of an image cell having a delicate membrane through which the ultrasonic waves passed, with the result that this membrane frequently broke.

It is, therefore, the principal object of this invention to provide a method and means whereby an actual representation of a hidden defect may be obtained in ultrasonic testing of objects by means which do not require the object under test to be submerged in a liquid, and which furthermore will yield the result desired by simple mechanism.

Further objects and advantages of this invention will become apparent in the following detailed description thereof.

In the accompanying drawings,

Fig. 1 is a side elevation partly sectioned vertically, and partly diagrammatic, of one embodiment of my invention.

Fig. 2 is a view similar to Fig. 1 showing a modified form of the invention.

Referring to Fig. 1, there is disclosed the principle of this invention in one embodiment thereof. An object 10 to be tested for internal defects D has applied to one surface 12 thereof an electro-acoustic transducer 15 which may be energized by an oscillator 16 which may be of the wobbulated type to transmit a wobbulated frequency and thus avoid setting up standing waves. The mechanical vibrations thus induced in transducer 15 which may be a quartz crystal, are transmitted through object 10 except in the area occupied by defect D where such waves will either be reduced in intensity or entirely prevented from passing through the object. If, therefore, on the opposite side 16' of object 10 there are means responsive to the intensity of vibrations passing through the object, and if this responsive means can be focused upon an image forming device, an actual pictorial representation of defect D will be obtained. To accomplish the above purpose applicant employs a novel lens system and does not require the object 10 to be immersed in liquid. Instead, this invention provides a lens system comprising a solid member 20 having a face which is placed in engagement with face 16' so that the ultrasonic waves passing through object 10 will enter member 20 and pass therethrough at a given velocity. Contiguous with member 20 is a member 21 of different acoustic velocity and having one end in engagement with the end of member 20. The meeting ends of members 20 and 21 are caused to fit exactly along a surface 25 having the shape necessary to cause the waves passing through member 20 to be focused upon an image cell 30 to be described hereinafter. The fact that members 20 and 21 have different acoustic velocities means that their meeting surface 25 will be a refracting surface and by properly shaping surface 25, the focusing of the image upon cell 30 can be effected. Thus, as shown, member 20 has higher acoustic velocity than member 21, and therefore the curvature of surface 25 is concave toward the right. If the acoustic velocity of member 20 is less than that of member 21, the curvature of surface 25 will be reversed.

The surface upon which the ultrasonic waves are focused by refracting surface 25 may be any well known image cell, such as, for instance, an image cell 30 which comprises a plurality of small metal discs 42 suspended in a liquid confined between diaphragm 40 and glass window 41. The waves pass through the diaphragm, and the discs tend to turn so that they are normal to the direction of propagation of the waves. The discs are randomly oriented when they are not in an ultrasonic field. Thus, when light is thrown on the front of the cell, a shadowgraph or pictorial representation is obtained.

The diaphragm 40 is in firm contact with the outer end of member 21 and therefore can withstand a greater degree of ultrasonic pressure than when in contact with a liquid on its receiving surface.

In focusing the image on the cell, it may be necessary to vary the distance from surface 16' of object 10 to the diaphragm 40. For this purpose the member 20 may be formed in two parts separated by a wedge 50 which can be moved into and out of a similar wedge space between the two parts of the member. In Fig. 1 the wedge has not been sectioned. For moving the wedge 50, adjusting screw 51 may be moved into and out of a screw threaded opening 52 in the wedge, the screw 51 being part of a stem 53 extending through a shell 54 and having a knurled knob 55 at its end. The shell 54 may telescope into a part 56 and normally be spring pressed by springs 57 engaging parts 54 and 56 so as to tend to draw the parts 20 together.

Felt washers 60, 61, 62, 63 saturated with oil may be provided on the periphery of members 20 and 21 so as to coact with meeting surfaces and maintain an oil film between said meeting surfaces. This will render it easier for the ultrasonic waves to pass through the interfaces and thus permit more energy to be transmitted to the diaphragm of image cell 30.

As described above, both the two-part member 20 and the member 21 are of solid material though of different acoustic velocities. In Fig. 2 I have disclosed a form of the invention wherein the member 21 may be replaced by a member 21a filled with a liquid such as water. The member 20 may be a material such as aluminum, so that meeting surface 25 will again be a refracting surface by reason of the different acoustic velocities of the two members. In this form of the invention, however, instead of forming member 20 in two parts to permit adjustment of the focal length, I may employ the following means for adjusting the focal length. The member 21a is formed with an enlarged portion 70 threaded on its inner edge and cooperating with the threaded end 71 of an image cell such as 30. The liquid fills the interior of member 21a and enlarged end 70 up to a level 72 which provides for volumetric variation of the liquid. Thus the diaphragm 40 may be moved toward or away from object 10 by screwing the cell 30 into or out of the threaded interior of member 70, and the space above level 72 will vary correspondingly.

The foregoing description discloses two forms of lens systems in each of which a solid member is positioned against the object under test, and in each of which a second member of different acoustic velocity from the member in engagement with the object is caused to engage the first member to provide a refracting surface. The two contiguous members form a single refracting surface of predetermined shape, designed to form an image upon the image cell. In each of the forms disclosed there is means for adjusting the focal distance to focus the energy on the image cell and therefore to yield the clearest representation of the internal defect.

Having described my invention what I claim and desire to secure by Letters Patent is:

1. In the ultrasonic inspection of objects by transmitting ultrasonic waves through one surface of the object, a device for indicating defects within the object, said device comprising a lens system including a solid member adapted to engage an opposite surface of the object for receiving the waves transmitted therethrough, a second member of different acoustic velocity from said first member having one end in engagement with said first member, an image cell in engagement with the other end of said second member and adapted to respond to the ultrasonic waves striking said wall whereby a visible image of the irregularities in the object is produced, the meeting surfaces of said first and second members comprising a single refracting surface formed to project the ultrasonic waves upon the image cell, and means for varying the length of at least one of said members for focusing the waves on the cell.

2. In the ultrasonic inspection of objects by transmitting ultrasonic waves through one surface of the object, a device for indicating defects within the object, said device comprising a lens system including a solid member adapted to engage an opposite surface of the object for receiving the waves transmitted therethrough, a second member of different acoustic velocity from said first member having one end in engagement with said first member, an image cell in engagement with the other end of said second member and adapted to respond to the ultrasonic waves striking said wall whereby a visible image of the irregularities in the object is produced, the meeting surfaces of said first and second members comprising a single refracting surface formed to project the ultrasonic waves upon the image cell, and means for varying the length of at least one of said members for focusing the waves on the cell, said last named means comprising one of said members formed into separate parts with cooperating oppositely sloping surfaces to form a wedge shaped opening, a wedge of the same acoustic velocity as the separable parts filling said opening, and means for varying the position of said wedge inside the opening.

3. In the ultrasonic inspection of objects by transmitting ultrasonic waves through one surface of the object, a device for indicating defects within the object, said device comprising a lens system including a solid member adapted to engage an opposite surface of the object for receiving the waves transmitted therethrough, a second member of different acoustic velocity from said first member having one end in engagement with said first member, an image cell in engagement with the other end of said second member and adapted to respond to the ultrasonic waves striking said wall whereby a visible image of the irregularities in the object is produced, the meeting surfaces of said first and second members comprising a single refracting surface formed to project the ultrasonic waves upon the image cell, and means for varying the length of at least one of said members for focusing the waves on the cell, said last named means comprising said second member in the form of a container having a column of liquid in the direction of transmission of the waves, and means for varying the length of the liquid column.

4. In the ultrasonic inspection of objects by transmitting ultrasonic waves through one surface of the object, a device for indicating defects within the object, said device comprising a lens system including a solid member adapted to engage an opposite surface of the object for receiving the waves transmitted therethrough, a second member of different acoustic velocity from said first member having one end in engagement with said first member, an image cell in engagement with the other end of said second member and adapted to respond to the ultrasonic waves striking said cell whereby a visible image of the irregularities in the object is produced, the meeting surfaces of said first and second members comprising a single refracting surface formed to project the ultrasonic waves upon the image cell, and means for varying the length of at least one of said members for focusing the waves on the cell, said last named means comprising said second member in the form of a container having a column of liquid in the direction of transmission of the waves, said container having a reservoir section communicating with the liquid column and having room for expansion and contraction of the liquid in the container, whereby varying the length of the liquid column will move liquid into and out of the reservoir section.

RALPH B. DE LANO, JR.

REFERENCES CITED

The following references are of record in the file of this patent:

FOREIGN PATENTS

| Number | Country | Date |
|--------|---------|------|
| 48,400 | Holland | May 15, 1940 |
| 587,257 | Great Britain | Apr. 18, 1947 |